United States Patent [19]

Mori

[11] Patent Number: 4,487,514
[45] Date of Patent: Dec. 11, 1984

[54] MOTOR

[75] Inventor: Hisamitsu Mori, Yokkaichi, Japan

[73] Assignee: Tokyo Shibaura Denki Kabushiki Kaisha, Kawasaki, Japan

[21] Appl. No.: 425,993

[22] Filed: Sep. 28, 1982

[30] Foreign Application Priority Data

Sep. 29, 1981 [JP] Japan .................................. 56-153051
May 14, 1982 [JP] Japan .................................. 57-70775

[51] Int. Cl.³ .......................................... F16C 32/06
[52] U.S. Cl. .................................................. 384/113
[58] Field of Search ............... 384/113, 107, 115, 123, 384/111, 373

[56] References Cited

U.S. PATENT DOCUMENTS 2,479,349  8/1949  Hagg .
3,121,179  2/1964  Macks ................................... 310/90
3,503,658  3/1970  Remmers ............................ 384/113
3,726,572  4/1973  Beardmore .......................... 384/113

FOREIGN PATENT DOCUMENTS 2624586 12/1976 Fed. Rep. of Germany .
344128  3/1960 Switzerland .

Primary Examiner—Lenard A. Footland
Attorney, Agent, or Firm—Cushman Darby & Cushman

[57] ABSTRACT

A motor comprises a housing, a cylindrical stationary shaft placed upright on the housing, and a rotational shaft rotatably and coaxially supported by the stationary shaft. The rotational shaft has a cylindrical hollow portion coaxially formed therewith, open at one end of the rotational shaft, and into which the stationary shaft is inserted. The motor further comprises a first dynamic pressure type bearing formed on the outer peripheral surface of the stationary shaft for generating a dynamic pneumatic flow between the outer peripheral surface of the stationary shaft and the peripheral surface of the hollow portion to bear the radial load of the rotational shaft, and a second dynamic pressure type bearing formed on the outer peripheral surface of the stationary shaft for generating a dynamic pneumatic flow between the outer peripheral surface of the stationary shaft and the peripheral surface of the hollow portion to bear the thrust load of the rotational shaft.

15 Claims, 6 Drawing Figures

F I G. 3
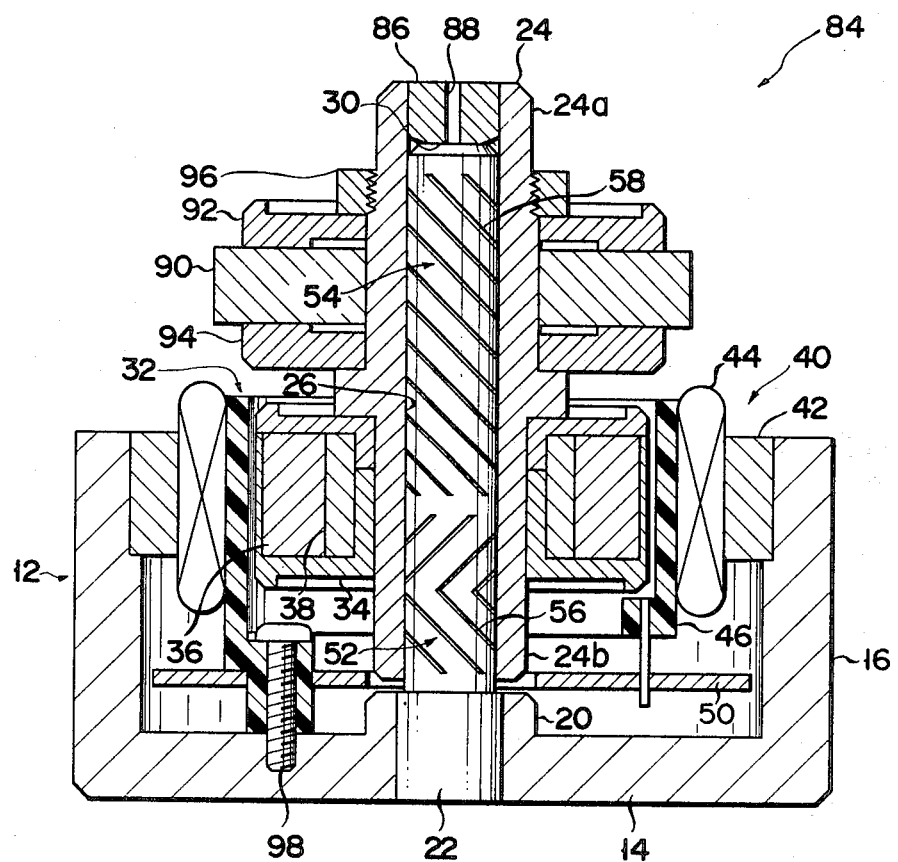

MOTOR

BACKGROUND OF THE INVENTION

The present invention relates to a motor and, more particularly, to a motor which has dynamic pressure type bearings.

Heretofore, a conventional motor having dynamic pressure type bearings includes in general a housing having a horizontal bottom, and a stationary shaft vertically placed upright on the bottom. A cylindrical rotational shaft, on which a rotor is mounted, is rotatably engaged on the outer periphery of the stationary shaft. This motor also has a radial load dynamic pressure type bearing and a thrust load dynamic pressure type bearing. The radial load dynamic pressure type bearing has an air groove formed on the outer peripheral surface of the stationary shaft. When the rotational shaft is rotated, the air groove serves to generate a dynamic pneumatic flow between the outer peripheral surface of the stationary shaft and the inner peripheral surface of the rotational shaft, thereby bearing the radial load of the rotational shaft. The thrust load dynamic pressure type bearing has an air groove formed on the bottom. When the rotational shaft is rotated, the air groove serves to generate a dynamic pneumatic flow between the bottom and the lower end surface of the rotational shaft, thereby bearing the thrust load of the rotational shaft.

In order to generate the above-described dynamic pneumatic flow, the respective members should be machined to a high dimensional accuracy. In other words, in the case of the above-mentioned conventional motor, it is constructed to generate dynamic pneumatic flows between the outer peripheral surface of the stationary shaft and the inner peripheral surface of the rotational shaft, and between the lower end surface of the rotational shaft and the bottom of the housing. Hence, these surfaces of the members should be machined to a high dimensional accuracy. Further, when the dynamic pneumatic flow is generated between the lower end surface of the rotational shaft and the bottom of the housing to bear the thrust load of the rotational shaft, the bottom is required to be as perpendicular as possible with respect to the stationary shaft. Accordingly, the stationary shaft and the bottom should be machined to a further high accuracy. Thus, the conventional motor has more members which must be formed with a high degree of accuracy. The motor requires several complicated steps of manufacture, and so its high cost is also a drawback.

SUMMARY OF THE INVENTION

The present invention has been made in consideration of these points and has for its object to provide a motor according to which, while dynamic pressure type bearings are employed, fewer portions are required for a high machining accuracy, the manufacture can be readily performed and manufacturing cost can be reduced.

According to one aspect of the invention, there is provided a motor which comprises: a housing; a stationary shaft stood on the housing and having an outer peripheral surface; a rotational shaft having a cylindrical hollow portion coaxially formed with the rotational shaft, open at one end of the rotational shaft, and into which the stationary shaft is inserted, so that the rotational shaft is rotatably and coaxially supported by the stationary shaft; a rotor mounted on the rotational shaft and rotating integrally with the rotational shaft; a stator mounted in the housing for rotating the rotor; first dynamic pressure type bearing formed on the outer peripheral surface of the stationary shaft for generating a dynamic pneumatic flow between the outer peripheral surface of the stationary shaft and the peripheral surface of the hollow portion by means of the rotation of the rotational shaft to bear the radial load of the rotational shaft; and second dynamic pressure type bearing formed on the outer peripheral surface of the stationary shaft for generating a dynamic pneumatic flow between the outer peripheral surface of the stationary shaft and the peripheral surface of the hollow portion by means of the rotation of the rotational shaft to bear the thrust load of the rotational shaft.

According to the motor of the present invention, the first and second dynamic pressure type bearings are formed on the outer peripheral surfaces of the stationary shaft, and are constructed to respectively generate dynamic pneumatic flows between the outer peripheral surface of the stationary shaft and the peripheral surface of the hollow portion. Therefore, according to this motor, only the outer peripheral surface of the stationary shaft and the peripheral surface of the hollow portion are required for a high machining accuracy. Accordingly, this motor has fewer portions which are required for a high machining accuracy than the conventional motor, and can be readily manufactured inexpensively.

BRIEF DESCRIPTION OF THE DRAWINGS

FIG. 3 is a longitudinal sectional view of a motor of a third embodiment according to the present invention;

DETAILED DESCRIPTION OF THE PREFERRED EMBODIMENTS

The embodiments of a motor according to the present invention will be described in detail with reference to the accompanying drawings.

Figure 1:
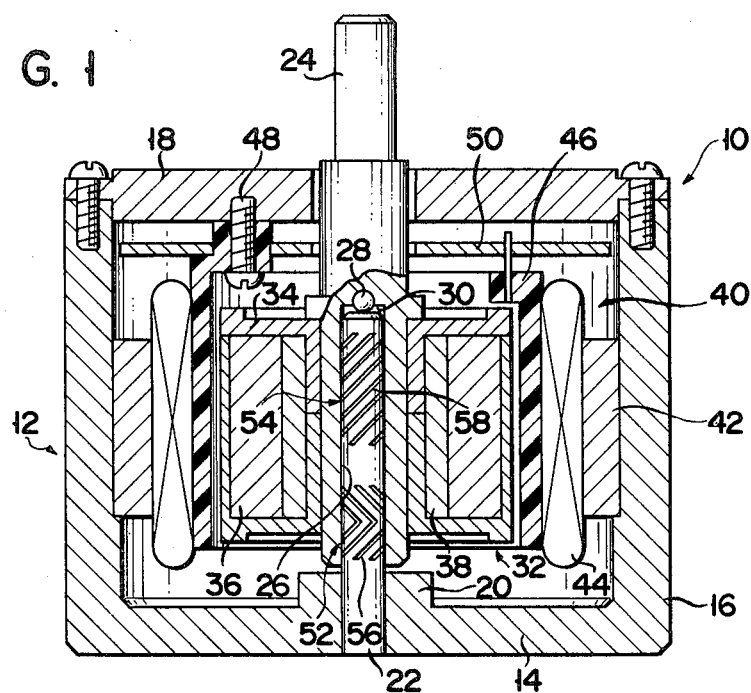
FIG. 1 is a longitudinal sectional view of a motor of a first embodiment according to the present invention.

FIG. 1 shows a motor 10 of a first embodiment according to the present invention. The motor 10 has a housing 12. This housing 12 has a cylindrical body 16 closed at one end with a bottom wall 14, and a bracket 18 detachably mounted on the body 16 and closing the other end of the body 16. The bottom wall 14 has a boss 20 at the center. A cylindrical stationary shaft 22 is secured to the boss 20. The shaft 22 extends vertically from the bottom wall 14 into the housing 12. The shaft 22 also has a vent hole (not shown) extending downward from its free end face and communicating with the outside of the housing 12.

The motor 10 further has a substantially cylindrical rotational shaft 24 rotatably and coaxially supported to the shaft 22. The shaft 24 has a cylindrical hollow portion 26 which is formed coaxially with the rotational shaft and is open at the lower end of the rotational shaft 24. The hollow portion 26 has a bottom 30 capable of being contacted with the free end face of the shaft 22. A steel ball 28 which bears the thrust load of the rotational shaft 24 at the low speed rotating time is mounted on the bottom 30. The diameter of the hollow portion 26 is set slightly larger than the outer diameter of the shaft 22. The shaft 22 is inserted into the hollow portion 26 until its free end face is contacted with the steel ball 28. Thus, the rotational shaft 24 is rotatably and coaxially supported with the stationary shaft 22. The upper end portion of the shaft 24 extends above the housing 12 through the bracket 18.

A rotor 32 is mounted on the shaft 24. The rotor 32 has a cylindrical magnet case 34 coaxially engaged with the shaft 24 and rotating integrally with the shaft 24. An annular magnet 36 and an annular magnet core 38 are mounted in the magnet case 34. The rotor 32 is disposed radially outwards from the hollow portion 26.

The motor 10 includes a stator 40 mounted in the housing 12 and rotating the shaft 24 together with the rotor 32. The stator 40 has a stator core 42 secured to the inner peripheral surface of the body 16 of the housing 12, and disposed radially outwards from the rotor 32. The stator 40 has a cylindrical coil bobbin 46 which has a plurality of armature coils 44 wound around the outer periphery of the coil bobbin and which is disposed radially outwards from the rotor 32 between the rotor 32 and the stator core 42. The coil bobbin 46 is secured to the bracket 18 with screw 48. Thus, the stator 40 is disposed radially outwards from the hollow portion 26 and the rotor 32. A circuit board 50 is attached to the coil bobbin 46 and is disposed above the rotor 32. A detector (not shown) for detecting the rotating position of the rotor 32 and an electronic part (not shown) for sequentially energizing respective electric coils 44 in accordance with a signal from the detector are mounted on the circuit board 50.

Further, the motor 10 comprises first and second dynamic pressure type bearings 52, 54 formed on the outer peripheral surface of stationary shaft 22, respectively. The first dynamic pressure type bearing 52 has a herringbone-shaped air groove 56 formed on the outer peripheral surface of the base end portion of the shaft 22. The groove 56 serves to generate a dynamic pneumatic flow between the outer peripheral surface of the shaft 22 and the peripheral surface of the hollow portion 26 by means of the rotation of the shaft 24 to bear the radial load of the shaft 24. The second dynamic pressure type bearing 54 has a spiral-shaped air groove 58 formed on the outer peripheral surface of the free end portion of the shaft 22. The groove 58 serves to generate a dynamic pneumatic flow between the outer peripheral surface of the shaft 24 and the peripheral surface of the hollow portion 26 by means of the rotation of the shaft 24 to bear the thrust load of the shaft 24. The dynamic pneumatic flow generated by the groove 58 includes the radial dynamic pressure bearing the radial load of the shaft 24.

The operation of the motor 10 thus constructed as described above will now be described.

When the armature coil 44 is energized and the rotor 32 and the shaft 24 are rotated, the dynamic pneumatic flow is generated between the outer peripheral surface of the shaft 22 and the peripheral surface of the hollow portion 26 by the operation of the grooves 56, 58. Thus, pneumatic pressure is generated between the outer peripheral surface of the shaft 22 and the peripheral surface of the hollow portion 26, with the result that the shaft 24 loses contact with the shaft 22 and the steel ball 28. The dynamic pneumatic flow generated by the groove 56 includes as a main component the radial pneumatic pressure and bears the radial load of the shaft 24. The dynamic pneumatic flow generated by the groove 58 includes as a main component the thrust pneumatic pressure and bears the thrust load of the shaft 24. The dynamic pneumatic flow generated by the groove 58 also includes the radial pneumatic pressure and bears the radial load of the shaft 24. The dynamic pneumatic flows generated by the grooves 56, 58 flow out of the housing 12 through the vent hole (not shown) formed at the shaft 22.

According to the motor 10 thus constructed as described above, both the first and second dynamic pressure type bearings 52, 54 bearing the radial and thrust loads of the shaft 24 are formed on the outer peripheral surface of the same shaft 22. Therefore, the portions which require high machining accuracy due to the generation of the dynamic pneumatic flows are only the outer peripheral surface of the shaft 22 and the peripheral surface of the hollow portion 26. Thus, the number of portions which require high accuracy is less than those of the conventional motor. Accordingly, the motor 10 can be readily machined and manufactured inexpensively. According further to the motor 10, the stationary shaft 22 is inserted into the hollow portion 26 of the shaft 24, and the rotor 32 and the stator 40 are disposed radially outwards from the hollow portion. Therefore, the length of the rotational shaft 24 can be shortened, and the axial length of the entire motor can also be shortened. In this manner, the center of gravity of the rotor can be lowered to provide a stable rotation, and the axial fluctuation of the shaft 24 can be prevented. In addition, since the weight of the shaft 24 can be reduced, the inertia of the shaft 24 can be reduced, thereby improving the speed rising characteristics of the motor.

Figure 2:
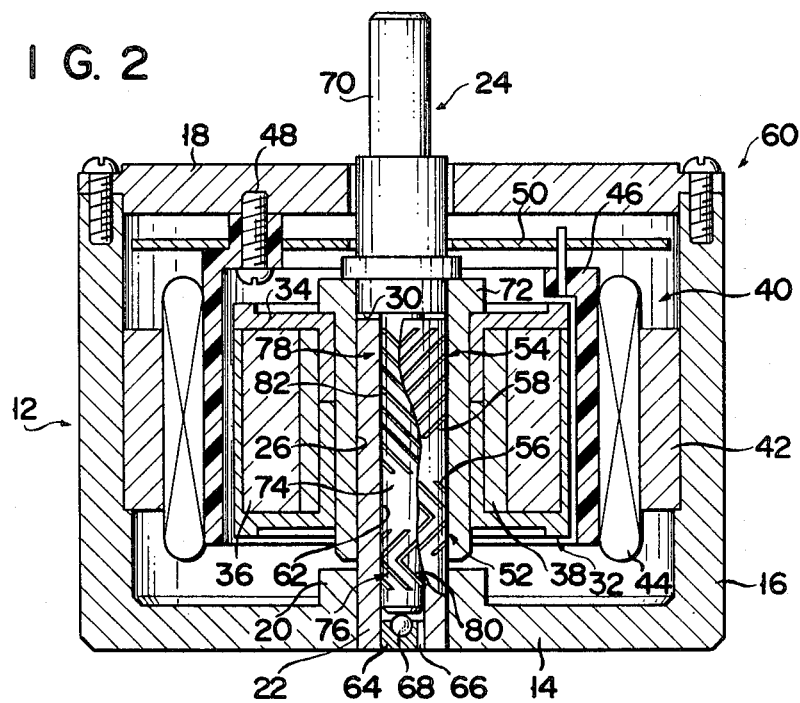
FIG. 2 is a longitudinal sectional view of a motor of a second embodiment according to the present invention.

A second embodiment of the motor according to the present invention will now be described. In FIG. 2, which shows the second embodiment of the motor according to the present invention, the same members as those in FIG. 1 are designated by the same reference numerals. Only the different members from those in the first embodiment will be described.

A motor 60 has a stationary shaft 22 which is secured to the bottom wall 14 of a housing 12 and which extends vertically upwards from the bottom wall 14 in the housing 12. The shaft 22 has an outer peripheral surface and an inner hole 62 of circular section formed coaxially with the shaft 22 through the shaft 22. In other words, the shaft 22 is formed in a cylindrical shape. The lower end of the hole 62 is closed by an end plate 64. An air inflow hole 66 is formed at the end plate 64. A thrust bearing steel ball 68 is mounted on the end plate 64.

The motor 60 also has a rotational shaft 24 rotatably and coaxially supported with the shaft 22. The shaft 24 has a substantially cylindrical main body 70 and a sleeve 72 coaxially secured to the lower end of the main body 70. The shaft 24 has a cylindrical hollow portion 26 coaxial with the main body 70 defined by the inner hole of the sleeve 72. The hollow portion 26 is open at the lower end of the shaft 24 and has a bottom 30. The shaft 22 is inserted into the hollow portion 62. The shaft 24 has a cylindrical inner shaft 74 formed coaxially and integrally with the body 70 and extending downward from the bottom 30 of the hollow portion 26. The shaft inner 74 is rotatably inserted into the hole 62 of the shaft 22. The extending end face of the inner shaft 74 is contacted with the steel ball 68. Thus, the shaft 24 is supported rotatably and coaxially with the shaft 22.

A first dynamic pressure type bearing 52 for bearing the radial load of the shaft 24 and a second dynamic pressure type bearing 54 for bearing the thrust load of the shaft 24 are respectively formed on the outer peripheral surface of the shaft 22. The first bearing 52 has a herringbone-shaped air groove 56 formed on the outer peripheral surface of the base end portion of the shaft 22. The second bearing 54 has a spiral-shaped air groove 58 formed on the outer peripheral surface of the free end portion of the shaft 22. The grooves 56, 58 respectively generate dynamic pneumatic flows between the outer peripheral surface of the shaft 22 and the peripheral surface of the hollow portion 26 to respectively bear the radial and thrust loads of the shaft 24. Further, the motor 60 comprises a third dynamic pressure type bearing 76 formed on the outer peripheral surface of the inner shaft 74 for bearing the radial load of the shaft 24 and a fourth dynamic pressure type bearing 78 formed on the outer peripheral surface of the inner shaft 74 for bearing the thrust load of the shaft 24. The third bearing 76 has herringbone-shaped air groove 80 formed on the outer peripheral surface of the free end portion of the inner shaft 74. The fourth bearing 78 has a spiral-shaped air groove 82 formed on the outer peripheral surface of the base end portion of the inner shaft 74. The grooves 80, 82 serve to generate dynamic pneumatic flows between the outer peripheral surface of the inner shaft 74 and the peripheral surface of the hole 62 of the shaft 22 to respectively bear the radial and thrust loads of the shaft 24. The motor 60 further has a rotor 32 mounted on the shaft 24 and rotating integrally therewith and a stator 40 secured to the housing 12. The rotor 32 and the stator 40 are respectively located radially outwards from the hollow portion 26.

When the shaft 24 of the motor 60 is rotated, the shaft 24 is rotated in the state of non-contact with the shaft 22 and the steel ball 68 by the operations of the first to fourth dynamic pressure type bearings 52, 54, 76, 78. The dynamic pneumatic flows generated by the first to fourth bearings 52, 54, 76, 78 are exhausted from the bottom 30 to the outside of the housing 16 through the vent hole (not shown).

The operation and advantages of the motor 60 thus constructed are similar to those of the first embodiment of the motor according to the present invention. Further, according to this second embodiment of the present invention, the motor 60 comprises, in addition to the first and second dynamic pressure type bearings 52, 54, the third and fourth dynamic pressure type bearings 76, 78. Therefore, this motor 60 can generate stronger dynamic pneumatic flows than the first embodiment, and can increase the radial and thrust load capacities.

A third embodiment of the present invention will be described with reference to FIG. 3.

A motor 84 has a housing 12. This housing 12 has a cylindrical body 16. The body 16 is closed at the lower end with a bottom wall 14 and is open at the upper end. The bottom wall 14 has a boss 20 at the center. A cylindrical stationary shaft 22 is secured to the boss 20. The shaft 22 extends vertically upwards from the bottom wall 14 through the opening of the housing 12.

The motor 84 has a cylindrical rotational shaft 24 supported rotatably and coaxially by the shaft 22. The inner hole of the shaft 24 is closed at the upper end with an end plate 86. A cylindrical hollow portion 26 formed coaxially with the shaft 24 is defined by the end plate 86 and the inner hole of the shaft 24. The hollow portion 26 is open at the lower end of the shaft 24, and has a bottom 30 formed by the end plate 86. The hollow portion 26 has a diameter slightly larger than the diameter of the shaft 22. The shaft 22 is inserted into the hollow portion 26. Thus, the shaft 24 is supported rotatably and coaxially by the shaft 22. The shaft 22 is inserted until the free end face of the shaft 22 contacts the bottom 30, that is the end plate 86. The end plate 86 has a vent hole 88. The end plate 86 operates as the thrust bearing of the shaft 24 at the stationary and low speed rotating time.

The motor 84 further comprises first and second dynamic pressure type bearings 52, 54 formed on the outer peripheral surface of the shaft 22. The first bearing 52 has a herringbone-shaped air groove 56 formed on the outer peripheral surface of the base end portion of the shaft 22. The groove 56 serves to generate dynamic pneumatic flow between the outer peripheral surface of the shaft 22 and the peripheral surface of the hollow portion 26 by means of the rotation of the shaft 24 to bear the radial load of the shaft 24. The second bearing 54 has a spiral-shaped air groove 58 formed on the outer peripheral surface of the center portion and the free end portion of the shaft 22. The groove 58 serves to generate the dynamic pneumatic flow between the outer peripheral surface of the shaft 22 and the peripheral surface of the hollow portion 26 by means of the rotation of the shaft 24 to bear the thrust load of the shaft 24. The dynamic pneumatic flow generated by the groove 58 includes the radial dynamic pressure for bearing the radial load of the shaft 24.

Figure 4:
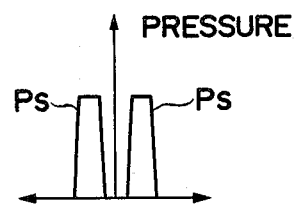
FIGS. 4 and 5 are characteristic diagrams respectively showing the pneumatic pressures of the motor in FIG. 3 in the thrust and radial directions.
Figure 5:
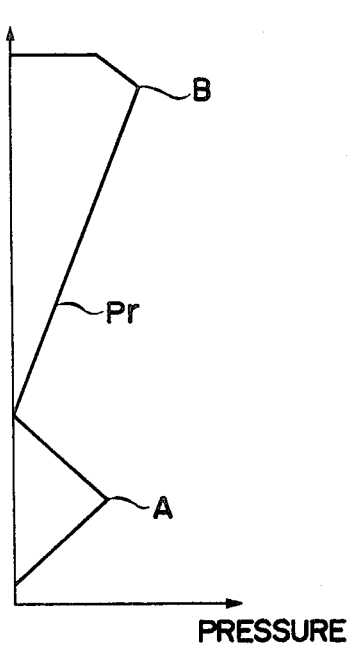
Figure 6:
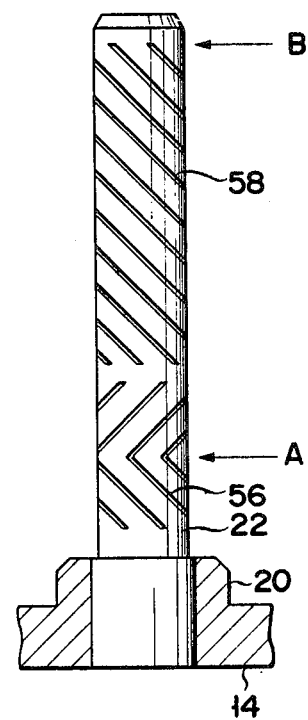
FIG. 6 is a side view of the stationary shaft of the motor in FIG. 3.

The characteristics of the dynamic pneumatic flows generated by the operation of the first and second dynamic pressure type bearings will now be described. When the shaft 24 is rotated, the dynamic pneumatic flows are generated between the outer peripheral surface of the shaft 22 and the peripheral surface of the hollow portion 26 by the operation of the grooves 56, 58. At this time, the air flows from the opening of the lower end of the hollow portion 26 into the space between the outer peripheral surface of the shaft 22 and the peripheral surface of the hollow portion 26, and flows out through the hole 88 of the end plate 86. The pneumatic pressure is generated between the outer peripheral surface of the shaft 22 and the peripheral surface of the hollow portion 26 by the dynamic pneumatic flow. Particularly, the pneumatic pressure which includes radial pressure as a main component is generated at the position formed with the groove 56. The pneumatic pressure which includes thrust pressure as a main component is generated at the position formed with the groove 58, and radial pneumatic pressure is also generated. The characteristics of the pneumatic pressures will be described with reference to FIGS. 4 and 5. In FIG. 4, the characteristic curve Ps indicates the pneumatic characteristics in the thrust direction along the radial direction of the shaft 22. In FIG. 5, the characteristic curve Pr indicates the pneumatic characteristics in the radial direction along the axial direction of the shaft 22. As can well be seen in FIGS. 5 and 6, the radial pneumatic pressure generated by the groove 56 reaches a maximum at the position A in the axial center of the range formed with the groove 56. The radial pneumatic pressure generated by the grooves 58 reaches a maximum at the position B of the upper end of the range formed with the groove 58.

On the other hand, the motor 84 has a rotor 32 mounted on the shaft 24 and rotating integrally with the shaft 24. The rotor 32 has a cylindrical magnet case 34 coaxially engaged with the shaft 24, an annular magnet 36 mounted in the magnet case 34 and an annular magnet core 38 mounted in the magnet case 34. The rotor 32 is mounted on the outer peripheral surface of the shaft 24 to be located at the vicinity of the maximum pneumatic pressure generating position of the groove 56, i.e., the vicinity of the position A and particularly above the position A. The motor 84 has a light-deflecting mirror 90 as a load element mounted on the shaft 24 and rotated integrally with the shaft 24. The mirror 90 has a polygonal shape. The mirror 90 is mounted on the outer peripheral surface of the shaft 24 with annular screw 96 in the state to be held from above and below with upper and lower holders 92 and 94. The mirror 90 is mounted on the shaft 24 to be located at the vicinity of the maximum radial pneumatic pressure generating position of the groove 58, i.e., the vicinity of the position B, and particularly below the position B. In this manner, the rotor 32 and the mirror 90 are disposed between the positions A and B. The upper end portion 24a of the shaft 24 extends upward from the mirror 90, and the lower end portion 24b extends downward from the rotor 32. The upper and lower end portions 24a, 24b are formed with equal outer diameters.

Further, the motor 84 has a stator 40 which is mounted in the housing 12, for rotating the shaft 24 together with the rotor 32. The stator 40 has a stator core 42 secured to the inner peripheral surface of the body 16 of the housing 12 and disposed radially outward from the rotor 32. Moreover, the stator 40 has a cylindrical coil bobbin 46 which has a plurality of armature coils 44 wound around the outer periphery of the stator 40 and which is disposed between the rotor 32 and the stator core 42 radially outward from the rotor 32. The coil bobbin 46 is secured to the bottom wall 14 with screw 98. A circuit board 50 is attached to the coil bobbin 46 and is disposed below the rotor 32. A detector (not shown) for detecting the rotating position of the rotor 32 is mounted on the circuit board 50.

According to the motor 84 constructed as described above, when the shaft 24 is rotated, the dynamic pneumatic flow is generated between the outer peripheral surface of the shaft 22 and the peripheral surface of the hollow portion 26 by means of the grooves 56, 58. Thus, the radial and thrust pneumatic pressures are generated between the outer peripheral surface of the shaft 22 and the peripheral surface of the hollow portion 26 by means of the dynamic pneumatic flow. Thus, the shaft 24 is supported in non-contacting state with the outer peripheral surface and the free end face of the shaft 22.

According to the motor 84, the first and second dynamic pressure type bearings 52, 54 for bearing the radial and thrust loads of the shaft 24 are formed on the outer peripheral surface of the shaft 22. Therefore, the portions which are required for high machining accuracy due to the generation of the dynamic pneumatic flow are only the outer peripheral surface of the shaft 22 and the peripheral surface of the hollow portion 26. Thus, the portions which require high accuracy are fewer than those of the conventional motor. Accordingly, the motor 84 can be readily manufactured, and can be manufactured inexpensively. Further, according to the motor 84, the rotor 32 and the mirror 90 of large mass are respectively disposed in the vicinity of the maximum pneumatic pressure generating position A of the groove 56 and in the vicinity of the maximum pneumatic pressure generating position B of the groove 58. Accordingly, the rotation of the shaft 24 can be stabilized, thereby obtaining high rotating accuracy. Further, the fluctuation of the shaft 24 can be prevented. Particularly, the rotor 32 and the mirror 90 are disposed between the positions A and B. Thus, the supporting state of the shaft 24 can be further stabilized. Moreover, according to the motor 84 thus constructed, the board 50 is cooled by the air flowing into the space between the outer peripheral surface of the shaft 22 and the peripheral surface of the hollow portion 26. Therefore, the board can be cooled without particular cooling means, thereby simplifying the structure. In addition, both the end portions 24a, 24b of the shaft 24 are formed with equal outer diameter. Accordingly, when the integral unit of the shaft 24, the rotor 32, the mirror 90 and the upper and lower holders 92, 94 is adjusted in balance before assembling the motor, the shaft 24 can be readily mounted on a balancing machine at both ends. The upper end portion 24a of the shaft 24 extends upward from the mirror 90, thus, when the end plate 86 is press-fitted into the upper end, it can prevent variations in the size of the shaft 24 from affecting the position of the shaft where the mirror 90 is mounted. In this manner, the mirror 90 which is required for very high circularity and concentricity can be maintained at the initial setting accuracy.

In the first to third embodiments described above, the first dynamic pressure type bearing is formed at the base end portion of the stationary shaft, and the second dynamic pressure type bearing is formed at the extending end portion of the stationary shaft. However, these first and second bearings may be formed at opposite positions to each other or on the peripheral surface of the hollow portion to obtain similar operations and advantages. In the embodiments described above, the rotor is disposed inside the stator as an inner rotor type motor. However, the present invention is not limited to the particular embodiments described above. For example, the present invention may also be applied to an outer-rotor type motor in which the rotor is disposed outside the stator. Further, the present invention is not limited only to a brushless motor, but may also be applied to the other types of motors. In the third embodiment described above, the load element is not limited only to the light-deflecting mirror, but may also be, for example, a turntable.

What is claimed is:
1. A motor comprising:
   a housing;
   a stationary shaft placed upright on the housing and having an outer peripheral surface;
   a rotational shaft having a cylindrical hollow portion coaxially formed with the rotational shaft, open at one end of the rotational shaft, and into which the stationary shaft is inserted, so that the rotational shaft is rotatably and coaxially supported by the stationary shaft;
   a rotor mounted on the rotational shaft and rotating integrally with the rotational shaft;
   a stator mounted in the housing for rotating the rotor;
   a first dynamic pressure type bearing including a herringbone-shaped air groove and formed on the outer peripheral surface of the stationary shaft for generating a dynamic pneumatic flow between the outer peripheral surface of the stationary shaft and the peripheral surface of the hollow portion of the rotational shaft by means of the rotation of the rotational shaft to bear the radial load of the rotational shaft; and a second dynamic pressure type bearing including a spiral-shaped air groove and formed on the outer peripheral surface of the stationary shaft for generating a dynamic pneumatic flow between the outer peripheral surface of the stationary shaft and the peripheral surface of the hollow portion of the rotational shaft by means of the rotation of the rotational shaft to bear the thrust load of the rotational shaft.

2. The motor according to claim 1, wherein said hollow portion of the rotational shaft includes a bottom capable of being contacted with the free end face of the stationary shaft.

3. The motor according to claim 2, wherein said stationary shaft includes an inner hole of circular section formed coaxially with the stationary shaft therethrough and the rotational shaft includes an inner shaft of cylindrical shape extending coaxially with the rotational shaft from the bottom of the hollow portion and rotatably inserted into the inner hole of the stationary shaft, and which further comprises:

a third dynamic pressure type bearing formed on the outer peripheral surface of the inner shaft for generating a dynamic pneumatic flow between the outer peripheral surface of the inner shaft and the peripheral surface of the inner hole by means of the rotation of the rotational shaft to bear the radial load of the rotational shaft; and a fourth dynamic pressure type bearing formed on the outer peripheral surface of the inner shaft for generating a dynamic pneumatic flow between the outer peripheral surface of the inner shaft and the peripheral surface of the inner hole by means of the rotation of the rotational shaft to bear the thrust load of the rotational shaft.

4. The motor according to claim 3, wherein said third dynamic pressure type bearing includes a herringbone-shaped air groove formed on the outer peripheral surface of the inner shaft, and the fourth dynamic pressure type bearing includes a spiral-shaped air groove formed on the outer peripheral surface of the inner shaft.

5. The motor according to claim 4, wherein said rotor and the stator are disposed radially outward from the hollow portion.

6. The motor according to claim 1, wherein said rotor and the stator are disposed radially outward from the hollow portion.

7. The motor according to claim 1, wherein said rotor is mounted on the rotational shaft in the vicinity of the maximum pneumatic pressure generating position of one of the first and second dynamic pressure type bearings, and which further comprises:

a load element mounted on the outer peripheral surface of the rotational shaft in the vicinity of the maximum pneumatic pressure generating position of the other of the first and second dynamic pressure type bearings and rotating integrally with the rotational shaft.

8. The motor according to claim 7, wherein said rotor and load element are respectively disposed between the maximum pneumatic pressure generating position of the first dynamic pressure type bearing and the maximum pneumatic pressure generating position of the second dynamic pressure type bearing.

9. The motor according to claim 8, wherein said rotational shaft has an end portion extending from the rotor, and the other end portion extending from the load element, and both end portions are formed in outer diameters equal to each other.

10. The motor according to claim 9, wherein said load element is a light-deflecting mirror.

11. The motor according to claim 1, wherein said rotor is mounted on the rotational shaft in the vicinity of the maximum pneumatic pressure generating position of the first dynamic pressure type bearing, and which further comprises:

a load element mounted on the outer peripheral surface of the rotational shaft in the vicinity of the maximum pneumatic pressure generating position of the second dynamic pressure type bearing and rotating integrally with the rotational shaft.

12. The motor according to claim 11, wherein said rotor and load element are respectively disposed between the maximum pneumatic pressure generating position of the first dynamic pressure type bearing and the maximum pneumatic pressure generating position of the second dynamic pressure type bearing.

13. The motor according to claim 12, wherein said rotational shaft has an end portion extending from the rotor, and the other end portion extending from the load element, and both end portions are formed in outer diameters equal to each other.

14. The motor according to claim 12, wherein said load element is a light-deflecting mirror.

15. The motor as in claim 1, wherein:

said stationary shaft includes a first extremity journaled to said housing and a second extremity different from said first extremity, said second dynamic pressure type bearing being formed on said outer peripheral surface closer to said second extremity of said stationary shaft than the first dynamic pressure type bearing.

* * * * *